United States Patent [19]

Novoa

[11] Patent Number: 4,858,738
[45] Date of Patent: Aug. 22, 1989

[54] SYSTEM OF AUXILIARY MASS DAMPERS TO RESTRAIN THE RESPONSE OF SLENDER ELASTIC STRUCTURES TO VIBRATIONS SUCH AS FROM EARTHQUAKES

[76] Inventor: Fernando Novoa, Santa Rosa 76, Santiago, Chile

[21] Appl. No.: 704,132

[22] Filed: Feb. 20, 1985

Related U.S. Application Data

[63] Continuation of Ser. No. 606,131, May 2, 1984, abandoned, which is a continuation of Ser. No. 936,051, Aug. 23, 1978, abandoned.

[30] Foreign Application Priority Data

Jul. 26, 1978 [CL] Chile ............................... 470/78

[51] Int. Cl.⁴ .............................................. F16F 7/10
[52] U.S. Cl. .................................... 188/378; 188/268; 174/42; 267/136; 200/301; 52/167
[58] Field of Search ............... 174/42; 188/371–382, 188/268, 266, 269, 267, 271; 267/140.1, 136, 137, 138, 140; 52/167, 173, 346, 573; 200/301; 98/58–65

[56] References Cited

U.S. PATENT DOCUMENTS

| | | | |
|---|---|---|---|
| 1,995,620 | 3/1935 | Monroe | 174/42 |
| 2,375,818 | 5/1945 | Peters | 188/268 X |
| 2,417,347 | 3/1947 | Brown | 188/268 |
| 2,469,167 | 5/1949 | Little | 188/268 X |
| 2,667,237 | 1/1954 | Rabinow | 188/268 X |
| 2,715,951 | 8/1955 | Lieber | 188/378 |
| 2,732,040 | 1/1956 | De Vost et al. | 188/378 |
| 2,846,028 | 8/1958 | Gunther | 188/267 |
| 3,006,656 | 10/1961 | Schaub | 188/267 X |
| 3,110,262 | 11/1963 | West | 188/268 X |
| 3,331,398 | 7/1967 | Goss | 188/268 X |
| 3,336,818 | 8/1967 | Allen | 188/267 X |
| 3,637,051 | 1/1972 | Paine et al. | 188/268 X |
| 3,911,199 | 10/1975 | Fischer | 174/42 |
| 3,938,625 | 2/1976 | Radermacher et al. | 188/268 X |
| 3,973,078 | 8/1976 | Wolf et al. | 52/167 X |
| 4,320,602 | 3/1982 | Richardson | 52/167 X |

FOREIGN PATENT DOCUMENTS 2533088 2/1977 Fed. Rep. of Germany ...... 188/268

Primary Examiner—Douglas C. Butler
Attorney, Agent, or Firm—Cushman, Darby & Cushman

[57] ABSTRACT

Structures subject to seismic or other vibrations, such as structurally flexible elements of electrical and mechanical power plants, are effectively damped to reduce stresses resulting from such vibrations, by a system of auxiliary mass dampers. The dampers are advantageously connected to the regions of greater expected oscillation in response to such vibrations, to reduce structural stresses. A preferred auxiliary mass damper takes the form of a receptacle containing a fluent or granular material such as lead birdshot in mineral oil.

2 Claims, 1 Drawing Sheet

SYSTEM OF AUXILIARY MASS DAMPERS TO RESTRAIN THE RESPONSE OF SLENDER ELASTIC STRUCTURES TO VIBRATIONS SUCH AS FROM EARTHQUAKES

REFERENCE TO RELATED APPLICATION

This is a continuation of Ser. No. 606,131, filed on May 2, 1984, now abandoned, which was a continuation of Ser. No. 936,051, filed Aug. 23, 1978, now abandoned.

BACKGROUND OF THE INVENTION

My invention refers to the need of either reducing or limiting, in the aforementioned elements and parts of equipment, the amplitude of oscillations induced on them by the vibrations specified. When these elements are parts are, on account of their nature, flexible and of only limited structural strength, they can not be dimensioned, either, to resist the maximal structural loads, or to accept the maximal displacements which may be induced on them, by the vibrations. This, on account of these elements representing an oscillator, in which their structural flexibility represents the elastic component, and their structural weight, the oscillating mass.

The energy introduced by the vibration begins to accumulate, in the oscillatory play between the kinetic energy acquired by the mass, and the potential energy, generated after a certain delay-characterized by the natural period of the oscillator-, by the elastic component. This oscillatory play continues to increase, until a state of equilibrium arrives, between the energy being introduced by the vibration, and the energy being dissipated, on account of the elastic hysteresis in the structural materials, and the friction which may be opposed to the movement of the mass. Both of these effects, jointly, represent the damping of the oscillator: if and when this damping is low enough, on account of the nature of the element, the oscillations could only be limited by introducing separate damping devices.

In the elements of the plants described above, the structural materials to be used (insulators, metal structures) are, indeed, frequently characterized, by their low energy absorption. Introducing vibration dampers into these elements may be, however, difficult: the dampers, to operate, need to detect the motion of the oscillator relative to the ground. But, in general, they can not be coupled to the maximum displacements of the elements (upper part of a column, middle part of a beam), and must be inserted, in the definite form of vibration isolators, between the element and its supports (base of a column, supporting ends of a beam). In these conditions, they introduce there, by nature, a considerable elasticity which, having been even welcomed, on occasions, as a distinct advantage, in most cases represents a serious difficulty, even an insuperable one, on account of the alterations which this flexibility may determine, on other functional characteristics of the element.

The design of the vibration isolators themselves, has been, moreover, strongly subdued on account of this location, and it has arrived that the isolators be self-defeating, on account of the displacements at other parts of the element, which result strongly amplified, as a geometrical consequence of the isolators' elasticity.

Former difficulties have called for a search to apply, to the elements and parts of the abovementioned plants, the already known principle of the dynamic vibration absorber, that means, a secondary oscillator fixed upon the element, in the zone of its maximal displacements, which transforms part of the energy in play, into dynamical reaction pulses, with a period somewhat different to that of the principle oscillator. If the ratios of the masses and of the periods are correct, the pulses will be adequate to alter the oscillatory play of energy within the principal oscillator: the "response" of this will not reach to the values it had, and the oscillations will be limited, by this dynamical effect, with a final result similar to what could have been obtained from an efficient set of vibration isolators.

By nature of this explanation itself, it may be feared that the dynamic absorber could only be operative if the values of its mass and its elasticity, are definitely determined for the principal oscillator involved, and then, only for periodical and permanent vibrations acting on. In other case, the pulses of the auxiliary mass could prove, at certain moments at least, self-defeating, and contributing more to increase the energy play, as to limit it.

The theory, however, establishes that this danger is overcome, by introducing into the secondary oscillator an adequate damping: this oscillator may be, in this case, considered as a device which pumps out of the principal oscillator, a part of the energy in play, to dissipate it within itself. An excessive value for this damping could, still, originate undue dynamical reactions, but the dynamical absorbing will be now effective, for a range of values of the mass and the elasticity of the auxiliary oscillator. Optimum effects could be obtained with masses between 10 and 20% of the principal one; natural frequencies within ±20% of the frequency of the principal oscillator, and auxiliary damping, between 10 and 20% of the critical.

If one intends to use a system of such auxiliary mass dampers with a standard design, even these values could be considered as demanding a too close matching to the element, for an adequate efficiency. It would be for the worse, if one considers that there is a certain interaction between these values, within these ranges, and the fact that the vibrations of interest are, by nature, irregular and transient.

There are, however, three more measures to be recurred at, to flatten the difficulties: (a) to fractionate the auxiliary mass into a quantity of small bodies or particles, so as to make its apparent frequency more the effect of a statistical behaviour, than a definite value; (b) to discard the elasticity of the auxiliary oscillator, leaving the mass to be restored by a means less well defined than that of a spring; (c) to eliminate the restoring effect for the mass, by having the auxiliary oscillator reduced to a "mass" with a "damper", but without any apparent "elasticity" (astatic oscillator. The three possibilities represent, in the end, the introduction of different types or grades of "non-linearity" into the auxiliary oscillator.

SUMMARY OF THE INVENTION

I have found that, practically all of the forementioned conditions, may be utilized, in the simplest form, within the system of auxiliary mass dampers I am proposing myself to use, which can be described as following:

DETAILED DESCRIPTION OF PREFERRED EMBODIMENTS

Figure 1:
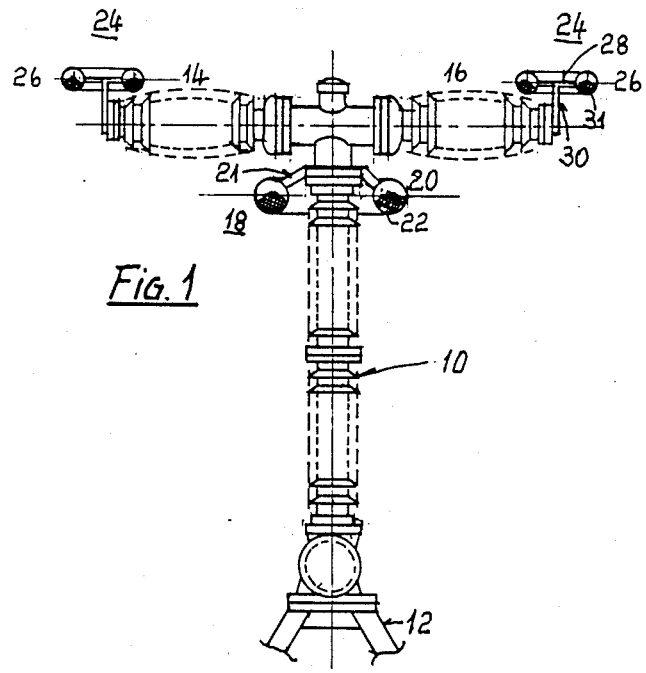
FIG. 1 is a somewhat schematic fragmentary side elevation view of a pole of an electrical power circuit breaker equipped with a plurality of vibration dampers in accordance with principles of the present invention.

The proposed system may be credited with the following possibilities:

(1) The ballast represents a mass, variable in form with friction, whose center of gravity is displaced within the receptacle, on submitting this to oscillation, but is restored to a preferred place, by the combined action of gravity, possible effects of an immersion medium, and the oscillation accelerations themselves. The set, represents, therefore, an auxiliary oscillator capable of acting as an auxiliary mass damper.

(2) This auxiliary oscillator does not have any elastic component as such. This does not exclude, however, that the receptacle may have a shape adequate to provide for a more or less linear mass restoring force, so more linear as more minutely divided the particles when immersed in a liquid, and more reduced be the amplitudes of oscillation. With wider amplitudes, however, the "non-linearity" of this oscillator will always appear; progressively, with the ballasts herein described, and more abruptly, for a/coarser ballast without liquid. These characteristics may be considered the most desirable in several cases, even more, if one remembers that the dynamical effect of the auxiliary oscillator, consists essentially in transforming the displacements of a bigger mass, into bigger displacements of a smaller mass. The irregular and transient vibrations can call the auxiliary mass to occasionally wider displacements, for which the "non-linear" characteristics will be valuable; with more regular vibrations, on the other hand, a "quasi-linear" characteristic could be more indicated.

(3) The proposed system is capable to provide, within reasonable dimensions, the necessary magnitudes for both, the apparent oscillatory mass and the apparent natural frequency. On contemplating, by ex., elements with 1000 kg or less of oscillatory mass, and 2 Hz or more of natural frequency, when intending to use ballasts, from metallic filings through sand, lead birdshots or steel balls, either combined or not with mineral oil, there would be sufficient, receptacles from 30 to 40 liters, which could be acceptable even not considering by now, the possibility and frequently the advantage, of apportioning the damping effect among several receptacles, as discussed below.

To arrive to the optimal frequency of the absorber, the speed of movement of the ballast can be regulated, by means of the shape and the dimensions of the receptacles, the internal divisions which could be disposed within them, or the effects of the immersion medium which could be used with the ballast.

(4) The proposed layout for the auxiliary oscillators results, by nature, adequate to obtain within them, without problems, the necessary damping. The friction between the particles of ballast and against the receptacle, can be controlled through their size, their shape and their superficial conditions; the hydrodynamic resistance which can oppose to motion the immersion medium may be varied, depending on the viscosity or buoyancy it can offer to the particles, or on the shape of them (ballast could be composed of small tube pieces, for example; the obstacles which may be opposed to the displacement of ballast, as the inner shape or surface condition of the receptacle, or baffles or diaphragms disposed in it: an adequate use of all these three major factors will allow, in each case, to arrive at the adequate damping, which appears so important to the efficiency of a dynamical absorber for the type of application involved.

(5) With the auxiliary oscillators proposed, it is easy to decrease or, even, to arrive at the suppression of all restoring force, by the simple expedient of adopting receptacles, either annular or cylindrical, with their bottom flat. Ballast equilibrium will be indifferent in them, with the advantages involved with this type of oscillator, which offers good dynamic absorption for a wider range of frequencies, although without arriving to optimal values for any of them. The end movement of the ballast at each shaking, will be reached without impact problems, on account of a single shock having been decomposed into several ones of the particles in a succession.

(6) Freedom of displacement for the ballast, is an important characteristic of the type of auxiliary oscillator proposed. First, on account of this displacement being limited only through the shape and the dimensions of the receptacle, it is possible, for the displacement, to be wider, by construction, than the displacement of the element involved, at the point of fixing of the oscillator. This makes it actually possible for it, to accomplish with its dynamical function (see 2 above).

Second, freedom of displacement makes possible for the ballast to be effective, within the same receptacle, for any direction of oscillation normal to its axis of symmetry and, even, for a certain component on the direction of this axis. This means a considerable advantage, for a dynamic absorber which is part of a system with normalized design, and represents a further advantage, on allowing the receptacle to be disposed with its symmetry axis at an angle with the vertical direction. With some effectiveness limitations, the receptacles can also be disposed with their symmetry axis on an horizontal direction.

Third, the ballast may be displaced also around the axis of symmetry, which allows the receptacle to be effective, in part, for torsional oscillations upon this axis. For efficiency reasons, however, it will be generally preferable in case of these, to dispose two additional receptacles, at the zones with maximum torsional displacements, in so much as these additional receptacles may be disposed so as to contribute, also, to the dynamical absorption of the lateral oscillations which the first receptacle cares for.

(7) The apportioning of the absorption effect between several receptacles, may result very important for reasons differing from these mentioned just above, or from the total dimensions resulting for the auxiliary oscillator capable of being effective in a given case.

First, it may be that, either functional conditions of the element or its physical layout, make necessary a fractioning, to conform each receptacle to those conditions; it is not excluded, in this case, that several receptacles may be communicating, to obtain a certain interchange of ballast between them.

Second, the element may result, from closer consideration, actually a set of flexible elements, the oscillatory response of each, be interesting to dynamically limit, separately. In case of there being two components with sufficiently close frequencies, it will be added to the oscillatory play of energy in each of them, another pumping of energy between the elements (oscillatory coupling). When it is not possible to avoid this coupling by a structural rearrangement of the whole, it will become very important the displacement of frequencies which introduces, by nature, the dynamical effect on each element. Well disposed, this frequency displacement can be used to separate apart the final frequencies, to reduce the original coupling.

Third, within an element in need of dynamical damping, there may be a definite distribution of masses and rigidities which give place to modes of oscillation differing from the fundamental one, which may have effects that be necessary to consider. The apportioning of the dynamic absortion among different receptacles, will allow to dispose them through the zones of mass concentrations for the several modes, making much better the general effect of the damping.

(8) It is important to discuss, also, the importance which may have the secondary effects of a system of dynamical absorbers as proposed, upon the elements to be treated.

First, it has been experienced, during the analysis of seismic tests upon high tension electrical equipments, the quite considerable effect which may exert the simple presence of chambers with a quantity of oil, on the upper part of columns subject to vibrations at the base. A system such as proposed, subject to all the optimization possibilities mentioned above, can be accepted that will allow a considerably higher reduction upon the loads induced by vibration. If the structural loads are reduced, by ex., by 2.5 times, it will not have great importance what they increase in turn, due to the own weight of the auxiliary mass dampers, which would add, in any case, less than 30% to the mass of the principal oscillator.

Second, under paragraphs (3) and (7) above, it has been implied how much tolerable may result, for the general layout of the element, the receptacles which need to be added. To show how much farther these receptacles may conform to the general design, we have selected 3 typical examples, given in FIGS. 1, 2 and 3 included. In case of FIG. 1, the receptacles would be metallic, hermetic, with a smooth outer shape, to be used as electrostatic field governing rings, either replacing existing similar rings without any dynamical effects, or adding to the electrical conditions of the element, if the rings had not been originally arranged on it.

Figure 2:
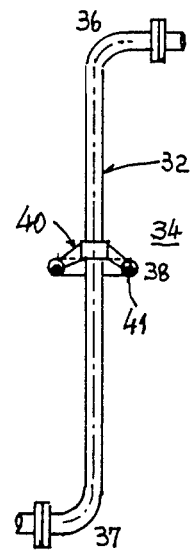
FIG. 2 is a somewhat schematic side elevation view of a run of piping equipped with a vibration damper in accordance with principles of the present invention.

In mechanical elements or parts, as it is the case for the vertical run of piping in FIG. 2, it may be the case that, by reasons of the placing of the pipe, or of its service conditions, be it not possible to arrange a rigid supporting structure, or that the flexible supports which could be added, be not acceptable on account of dynamical effects in the combined set piping-supports. By adding the dynamic absorber, the pipe run could be made either self supporting, or compatible with flexible supports of its own weight.

Figure 3:
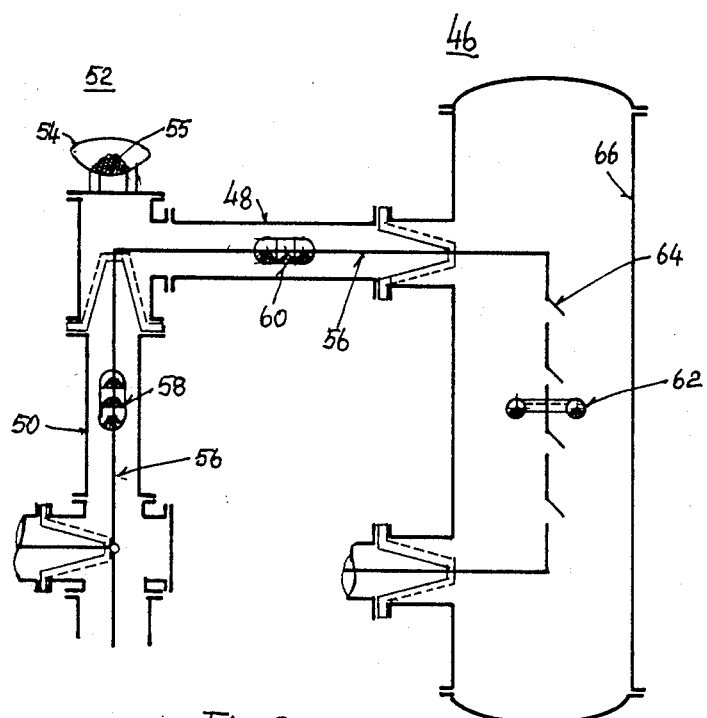
FIG. 3 is a somewhat schematic fragmentary longitudinal sectional view of an electrical circuit breaker equipped with a plurality of vibration dampers in accordance with principles of the present invention.

In the case of FIG. 3, the cylindrical receptacle A" would absorb the oscillations resulting from lack of stiffness of the section in form of inverted L at left. Some internal elements at the high tension, however, could need separate dynamic absorbing, on account of their own oscillating characteristics: this, could be supplied by the annular receptacles B" and C", which, when designed with metallic enclosure, hermetic and fixed, could be shaped and dimensioned as screen electrodes to maintain the electric field uniformity.

In FIG. 1 of the drawings there is illustrated somewhat schematically in fragmentary side elevational view, a pole of a 245 kV electrical power circuit breaker 10 having an insulating column 12 and breaking chambers 14. The insulating chamber is shown having connected thereto a vibration damper 16 in the form of a ring-shaped receptacle A which circumferentially surrounds the pole above the insulating column, next to the breaking chambers. The receptacle A of this example is 0.7 meters in diameter and has a transverse cross-sectional area which is 15 cm. in diameter. Each breaking chamber 14 is shown having connected thereto a respective vibration damper 18 in the form of an ovoidal ring-shaped receptacle B mounted to the respective breaking chamber 14 by a connector 20. Each ovoidal ring receptable B has a major diameter of 0.3 meters, a minor diameter of 0.2 meters and a transverse cross-sectional area which is 8 cm. in diameter. The receptacle A and the receptacles B contain as ballast: lead birdshot immersed in mineral oil.

In FIG. 2 of the drawings, there is illustrated somewhat schematically in side elevational view a vertical run of piping 22 having connected thereto a vibration damper 24 in the form of a ring-shaped receptacle A' which circumferentially surrounds the piping 22 and is connected thereto by the connecting element 26. The receptacle A' of this example is 0.2 meters in diameter and has a transverse cross-section which is 6 cm. in diameter. The receptacle A' contains a ballast: dry sand.

In FIG. 3 of the drawings, there is illustrated somewhat schematically in fragmentary longitudinal sectional view an $SF_6$ Metalclad, 300 kV electrical circuit breaker 26. Of the three types of vibration dampers 28, 30 and 32 shown connected to the circuit breaker 26, receptacle A" is a cylinder which is 0.5 meters in diameter and 20 cm. in height, receptacles B" are rings or cylinders and receptacles C" are rings. In each instance, the ballast is provided in the receptacles A", B" and C" as lead birdshot in oil.

The present invention provides a system for dynamically limiting oscillations induced upon elements and parts, either component or structural, of electrical and mechanical power plants, by the vibrations, more or less irregular and transient, of a seismical or another origin, be they derived or not from the functions of the plant, vibrations which may appear in the supports of the elements, or may be introduced on them by any other way.

Such a system is characterized by including an auxiliary mass damper means, characterized by having one or more receptacles, either communicating or not, within which it is put a ballast, which can be shaken more or less freely by the oscillations.

The receptacle may be a receptacle built of metallic or non-metallic materials, to be fixed on, around or beside the element to be damped or may be included in the design of the element, assuming the role or as a part of components having already other functions. The ballast may be constituted by a quantity of particles or solid bodies, either rigid or not, of homogeneous material or not, but loose and small, with regular or irregular shape and size, immersed or not in any liquid or gaseous medium, different than plain atmospheric air, intended for, either increasing the physical or chemical stability of the particles against time, or altering the displacement properties of the particles, on account of a certain buoyancy, a hydrodynamic resistance or a lubrication effect. The oscillatory mass may be controlled by adjusting the size of the receptacle or the quantity and density of the components of the ballast. The magnitude of the displacement of the oscillating mass may be controlled by adjusting the dimensions and shape of the receptacles or by providing or not providing subdividing means in the receptacle. The apparent frequency of displacement of the ballast may be controlled by adjusting the magnitude of displacement or varying the shape of the surface of the receptacles, or the composition of the ballast, its particle size, density or shape, or the quantity, density or displacement properties of such fluid medium as the particles may be immersed in. The energy absorption of the vibration dampers may be controlled by adjusting the frictional characteristics of the ballast particles by varying their shape and surface treatment, by varying the buoyancy, viscosity or resistance that such fluid medium may offer the particles, by varying the container shape, rugosity and baffle or diaphragm structure opposed to displacement of the ballast. And the type and grade of linearity of the ballast particle displacement may be adjusted by the same means.

(9) The application of the proposed dynamic absorbing system does not imply that the direct absorbing dampers would be excluded. On the contrary, these will be continuously useful, or necessary, as may be the case, to be inserted in those places where the elasticity introduced by them, be useful to reduce possible oscillatory couplings or, indeed, to introduce displacement possibilities between the elements, where it be necessary, without introducing but a limited transmission of loads. The basic objective sought by the system proposed would be, on the other hand, to introduce, without any change in the structural arrangement of those elements which do not admit the introduction of elasticity, a dynamical effect equivalent to the damping which an efficient set of elastic isolators would offer. In other words, to limit efficiently the loads on the element, without increasing its displacements.

The circumstances that the proposed dynamic absorbing system, does only demand from the elements, the space and the support for the receptacles, will make much simpler the technological problem of adapting oscillation limiters to an existing design, and the economical load of doing it into an existing plant. Only dynamical dampers like B and C in the FIG. 3, would need closer coordination with the design, and would make difficult their adding into an already commissioned plant.

(10) It is important, finally, that the optimization of the conditions in a damping system like this, be made possible by simple means: on having the necessary experience, it can be made, principally, on the basis of free oscillating tests of the elements to be submitted to dynamical damping. By these means, several prototypes can be compared, with different shapes and dimensions of receptacles, and different alternatives in the ballast, to select the most adequate for the elements involved. From the results, only one alternative for the receptacles may be tested, for a final optimization of the ballast, on an oscillating table with sinusoidal excitation, to get the best possible response characteristic against the excitation frequency.

A final verification can be made, at the same oscillating table, by applying the excitation amplitudes necessary to obtain, at each of the damped resonant frequencies acting upon the element with the final dynamical dampers, the maximal responses which may be calculated, for the specified design vibrations, from the response characteristics mentioned above. The whole of the process is similar to the one already adopted, for those elements damped through vibration isolators.

I claim:

1. A method for damping vibration of a slender, elastic structural element which, on account of being fixed by at least one end to a base subjected to earthquake, is subject to a high oscillatory response, owing to its inherent functional design, said method comprising:
providing at least one receptacle constructed and arranged for moving together with a respective point of maximum displacement response to said element in a principal oscillatory mode thereof;
filling into each said receptacle a quantity of ballast in the form of a loose mass of material, so that the ballast is contained by the receptacle but is able to move freely therein so that the total mass of all of such ballast is 10–20 percent of the principal mass of said element, thereby constituting at least one auxiliary mass damper;
rigidly attaching each said auxiliary mass damper to said element at a respective point close to a respective said point of maximum displacement response so that, as said element is subjected to earthquake:
 (a) the apparent frequency of movement of the respective said ballast within each respective said receptacle is somewhat different than the natural frequency of oscillation of said element alone, but within 20 percent of that value,
 (b) the freedom of movement of the respective said ballast within each respective said receptacle allows for an oscillatory displacement of the center of gravity of each respective said receptacle with respect to the center of gravity of the respective said ballast that is at least several times greater than the maximal oscillatory response of said element at the respective said point of attachment of said receptacle, and
 (c) the damping of the oscillatory movement of the ballast by friction is equivalent to 10–20 percent of the critical ratio of such movement, so that, in respect of said principal mode of oscillation of said element, the oscillatory energy of said element is first dynamically converted into higher-displacement oscillations of the mass of said ballast and finally dissipated by the inherent friction of the oscillating ballast so as to counteract the tendency of said structural element to vibrate during an earthquake.

2. The method of claim 1, wherein:
said at least one auxiliary mass damper comprises at least two auxiliary mass dampers.

* * * * *